(12) United States Patent
Bevilacqua et al.

(10) Patent No.: US 6,467,995 B2
(45) Date of Patent: *Oct. 22, 2002

(54) SELF-FLUSHING PIPE

(76) Inventors: Joseph Bevilacqua, 436 N. Derry Rd., Lyalhanna, PA (US) 15661; Heather Marie Barnes, 528 Greenmont Dr., Canfield, OH (US) 44406

( * ) Notice: Subject to any disclaimer, the term of this patent is extended or adjusted under 35 U.S.C. 154(b) by 0 days.

This patent is subject to a terminal disclaimer.

(21) Appl. No.: 09/732,795

(22) Filed: Dec. 8, 2000

(65) Prior Publication Data

US 2002/0025225 A1 Feb. 28, 2002

Related U.S. Application Data

(63) Continuation-in-part of application No. 09/400,720, filed on Sep. 21, 1999, now Pat. No. 6,202,700.
(60) Provisional application No. 60/112,593, filed on Dec. 17, 1998.

(51) Int. Cl.[7] .......................... E02B 11/00; E01C 11/22; E04D 13/04; B08B 3/02; B08B 9/032
(52) U.S. Cl. .............. 405/48; 405/44; 52/11; 134/166 C; 138/108; 404/4
(58) Field of Search .......................... 52/11; 134/166 C, 134/169 C; 138/105, 108, 111, 112, 163, 167, 169; 404/2, 4; 405/36, 43, 44, 48, 119

(56) References Cited

U.S. PATENT DOCUMENTS

| | | | |
|---|---|---|---|
| 265,716 A | 10/1882 | Taylor | 138/163 |
| 1,150,946 A | 8/1915 | Kenlon | 138/32 |
| 2,366,522 A | 1/1945 | Gutman | 405/46 |
| 3,468,130 A | 9/1969 | Gibson | 405/39 |
| 4,183,368 A | 1/1980 | Husted | 134/166 |
| 4,188,154 A | 2/1980 | Izatt | 405/43 |
| 4,239,486 A | 12/1980 | Gomez | 432/225 |
| 4,436,518 A | 3/1984 | Buss | 428/595 |
| 4,590,722 A | 5/1986 | Bevilacqua | 52/169.5 |
| 4,612,742 A | 9/1986 | Bevilacqua | 52/169.5 |
| 4,904,112 A | 2/1990 | McDonald | 405/45 |
| 4,930,272 A | 6/1990 | Bevilacqua | 52/169.5 |
| 5,009,715 A | 4/1991 | Wilson | 134/166 C |
| 5,035,095 A | 7/1991 | Bevilacqua | 52/169.5 |
| 5,660,008 A | 8/1997 | Bevilacqua | 52/169.5 |
| 5,785,454 A | 7/1998 | Ringdal et al. | 405/45 |
| 5,867,945 A * | 2/1999 | Scafidi | 52/11 |
| 5,921,711 A | 7/1999 | Sipaila | 405/45 |
| 6,082,052 A | 7/2000 | Kahn | 52/16 |
| 6,082,409 A | 7/2000 | Sagar | 138/32 |
| 6,139,077 A | 10/2000 | Molzan, III | 294/19.1 |
| 6,151,836 A | 11/2000 | McGlothilin et al. | 52/11 |

* cited by examiner

Primary Examiner—Thomas B. Will
Assistant Examiner—Tara L. Mayo
(74) Attorney, Agent, or Firm—Emerson & Skeriotis; Roger D. Emerson; John M. Skeriotis

(57) ABSTRACT

A drainage pipe for use in a waterproofing system includes a plurality of openings. The drainage pipe includes a cleaning tube affixed to an interior surface of the drainage pipe. The tube has a plurality of spaced holes which allow fluid such as air or water to be forced out of the tube and clean debris from the drainage pipe. A garden hose, air hose or other fluid source can be attached to the tube.

20 Claims, 2 Drawing Sheets

SELF-FLUSHING PIPE

This application is a continuation-in-part of application Ser. No. 09/400,720 now U.S. Pat. No. 6,202,700 filed Sep. 21, 1999, which claims priority from a U.S. Provisional Application having Serial Number 60/112,593 filed on Dec. 17, 1998.

BACKGROUND OF THE INVENTION

1. Field of Invention

This invention pertains to the art of methods and apparatuses for drainage pipes for waterproofing systems. More specifically, the invention relates to methods and apparatuses for providing a self-flushing pipe for use with a water-proofing system.

2. Description of the Related Art

The related art deals with providing waterproofing systems to eliminate water from areas around a home, building or other structure. Some prior art waterproofing systems use a porous cylindrical pipe mounted below the level of a basement floor to aid in eliminating water from a basement. The pipe is positioned below and around the perimeter of the basement floor.

U.S. Pat. No. 4,590,722 discloses a drainage system for basements, which was also invented by the present inventor. In this drainage system, a drainage pipe having a rectangular or square cross-section and a plurality of openings located at lower sidewall portions is used. These openings allow water to flow into the pipe from the surrounding area, thus eliminating water on the basement floor. The above-mentioned pipe reduces and/or eliminates water problems.

While other waterproofing systems require excavation and back filling of the exterior perimeter of the house, the above-mentioned drainage system allows waterproofing to be performed inexpensively from inside of the structure.

However, in any waterproofing system, particulate material, such as gravel, dirt, and other debris may flow into a waterproofing pipe. This debris, and the accumulation thereof, decreases the efficiency of the water flow through the pipe. Obstruction of the drainage pipe hinders its performance in channeling water away from the structure. Consequently, it is desirable to flush out the drainage pipe to remove the particulate material causing this obstruction. The invention described herein is designed to overcome the foregoing difficulties of debris accumulation in a drainage pipe and provide better and more advantageous overall results.

SUMMARY OF THE INVENTION

In accordance with the present invention, a new and improved drainage pipe is provided eliminating the inherent problems with the related art, as discussed above. The drainage pipe of the present invention is submerged about the perimeter of the basement floor or a roof. The pipe has an opening allowing water to enter the pipe from an area surrounding the structure, and the drainage pipe directs water away from the structure. Thereafter, the water is delivered out of an end of the drainage pipe, typically into a drainage sewer or culvert.

According to one aspect of the present invention, a drainage apparatus for use in a waterproofing system comprises a hollow drainage pipe having a length, an upper interior surface with a plurality of spaced openings therein, an outlet, and cleaning means affixed to the upper interior surface.

According to another aspect of the invention, the cross-sectional profile of the drainage pipe is rectangular.

According to another aspect of the invention, the drainage pipe comprises an upper section having an inverted U-shaped cross-sectional profile, the upper section including the upper interior surface; a lower section having a U-shaped cross-sectional profile; and, embracing means for selectively securing the upper section to the lower section.

According to another aspect of the invention, the cleaning means comprises a tube having a plurality of spaced holes therein.

According to another aspect of the invention, the tube has a length generally equal to the length of the drainage pipe.

According to another aspect of the invention, the drainage apparatus further comprises extension means extending from a first end of the tube.

According to another aspect of the invention, at least some of the plurality of spaced holes are angled relative to a plane of the upper interior surface.

According to another aspect of the invention, a method is provided for clearing. debris from a hollow drainage pipe having a length, an upper interior surface, an outlet, and a plurality of spaced openings therein wherein the drainage pipe is used in a waterproofing system. The method includes the steps of providing cleaning means affixed to the interior surface.

According to another aspect of the invention, the method further comprising the step of causing a fluid to flow into the tube and exit through the plurality of spaced holes to force the debris through the outlet of the drainage pipe.

According to another aspect of the invention, the cleaning means further comprises an extension means at a first end of the tube, the extension means being adapted for use with an associated fluid source, the method further comprising the step of attaching the extension means to the fluid source.

According to another aspect of the invention, a method is provided for assembling a drainage apparatus for use in a waterproofing system wherein the drainage apparatus comprises a drainage pipe having an upper section, a lower section, and embracing means for selectively securing the upper section to the lower section; and, cleaning means comprising a tube having a plurality of spaced holes therein. The method comprises the steps of affixing the tube to an interior surface of the upper section of the drainage pipe; placing the upper section and the lower section in predetermined relationship to each other; and, employing the embracing means to selectively secure the upper section to the lower section.

According to another aspect of the invention, the method further comprising the step of affixing the extension means to a first end of the tube.

One advantage of the present invention is that debris can be easily and quickly removed from the interior of a drainage pipe.

Another advantage of the present invention is that an extension of the cleaning means can be readily adapted for use with a garden hose or pressurized air source.

Another advantage of the invention is that the drainage pipe may be formed of interconnecting U-shaped pieces, allowing for easy attachment of the cleaning tube to the interior surface of the upper section.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
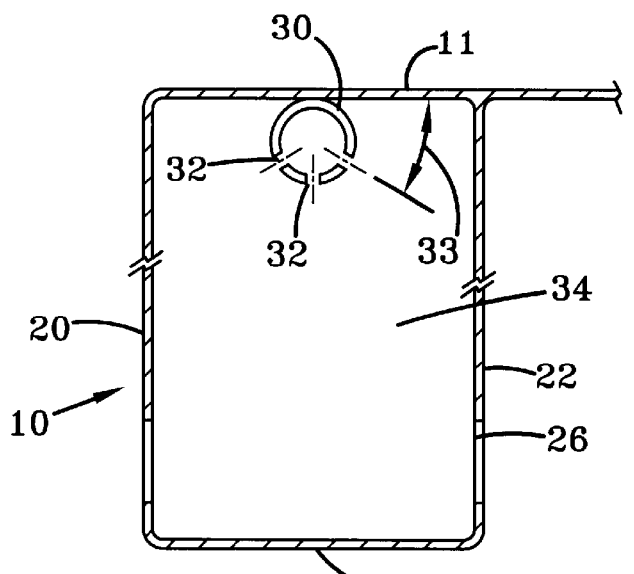
FIG. 1 is an end view of the pipe of the present invention.

Referring now to the drawings, which are for purposes of illustrating a preferred embodiment of the invention only and not for purposes of limiting the same, FIG. 1 shows a cross-sectional view of a hollow drainage pipe 10 having an interior surface 11 for use in a waterproofing system. The drainage pipe 10 includes a plurality of openings 26 therein for allowing water from outside the drainage pipe 10 to enter the drainage pipe 10 and flow to a drainage site.

In the present invention, means are provided to remove and or dislodge debris which may accumulate in the drainage pipe 10. Generally, the cleaning means 28 is affixed to the interior surface 11, spaced from the lowermost part of drainage pipe 10. As will be described in further detail below, the cleaning means 28 directs fluid such as air or water toward the interior surface 11 of the drainage pipe 10 in order to remove and or dislodge any accumulated debris.

Figure 2:
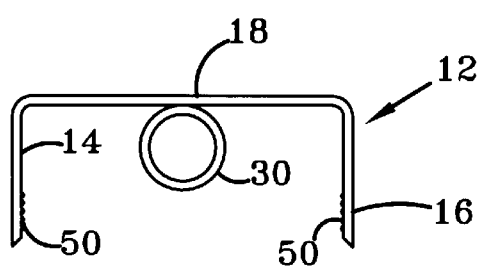
FIG. 2 is an end view of the upper section of the pipe of the present invention.
Figure 3:
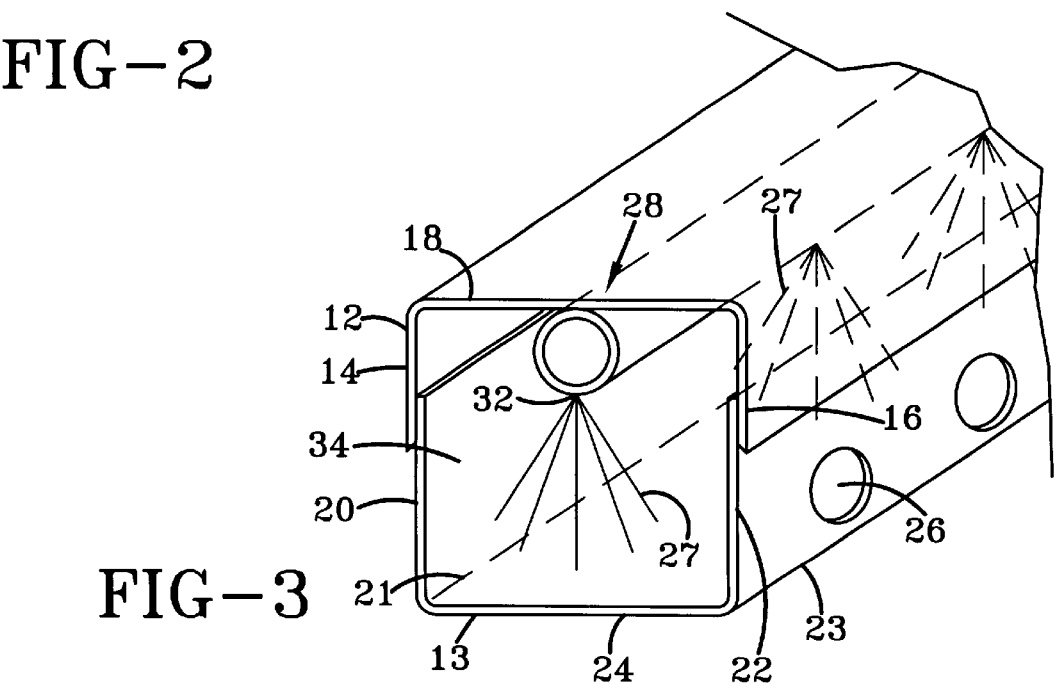
FIG. 3 is a perspective view of the present invention.

The drainage pipe 10 may be rectangular in cross section, however, alternative shapes are within the scope of this invention. As shown in FIG. 2, the drainage pipe 10 includes an upper section 12. The upper section 12 overlaps lower section 13 as shown in FIG. 3. The upper section 12 is an inverted U-shape having sides 14, 16 and a top portion 18. The lower section 13 is U-shaped having sidewalls 20, 22 and base portion 24. In the preferred embodiment, the side sections 14, 16 of the upper section 12 overlap the sidewalls 20, 22 of the lower section 13. Preferably, the drainage pipe 10 includes an embracing means 50 to maintain contact between side sections 14, 16 and sidewalls 20, 22. The embracing means 50 grips or secures the upper section 12 to the lower section 13. The embracing means 50 is shown in its preferred embodiment in FIG. 2 as ridges that extend inwardly from sides 14, 16. It is within the scope of this invention that embracing means 50 comprise a means to either rigidly attach or provide secure closure of the upper and lower sections 12, 13. The objects of the present invention can also be accomplished by a drainage pipe that is comprised of only one piece.

With reference to FIGS. 1 and 2, the present invention includes cleaning means 28 for providing a means to eliminate debris and the like, which may accumulate within the interior portion of the pipe 10. As water enters the pipe 10 through openings 26, debris may be deposited on the base 24, along sidewalls 20, 22 and in the areas where sidewalls 20, 22 meet base 24. Preferably, the cleaning means 28 comprises a tube 30 that is affixed to an interior surface 11 of the upper section 12. The tube 30 has an associated length that conforms generally to the length of the drain pipe 10. Preferably, the inside diameter of the tube 30 is in the range of 0.375 inches (9.525 mm) to 1.5 inches (38.1 mm) and, in its most preferred embodiment, 0.625 inches (15.875 mm). The most preferred diameter given above is the diameter of a standard garden hose. The tube 30 has small holes 32 located along its length such that when a fluid is forced through the tube 30, the fluid exits from theses holes 32. In one embodiment of the invention, the fluid forces debris to move toward an end 34 of the pipe 10. FIG. 3 shows the spray of fluid 27 out of the holes 32 and its downward direction. The pressure at which the fluid sprays out of the holes 32 is dependent upon the size of the holes 32 and the fluid pressure. Preferably the diameter of each hole 32 is in the range of 0.0156 inches (0.397 mm) to 0.5 inches (12.7 mm) and, in its most preferred embodiment, 0.03125 inches (0.794 mm). With reference again to FIG. 1, in the preferred embodiment, several of the holes 32 are configured such that the fluid sprays out of the tube 30 at a predetermined angle 33 measured with respect to the plane of top portion 18. The holes 32 may be located anywhere along the perimeter and length of the pipe 10. This angled spray 27 acts to push the debris along the base 24 of the pipe 10 and out an end 34 of the pipe 10 and into a drainage sewer or culvert (not shown). In the most preferred embodiment, angle 33 measures±45°. It is envisioned that the current invention cleans out the entire interior of the pipe 10, including the corners 21 and 23 formed at the intersections of sidewalls 20 and 22 with the base portion 24.

Figure 4:
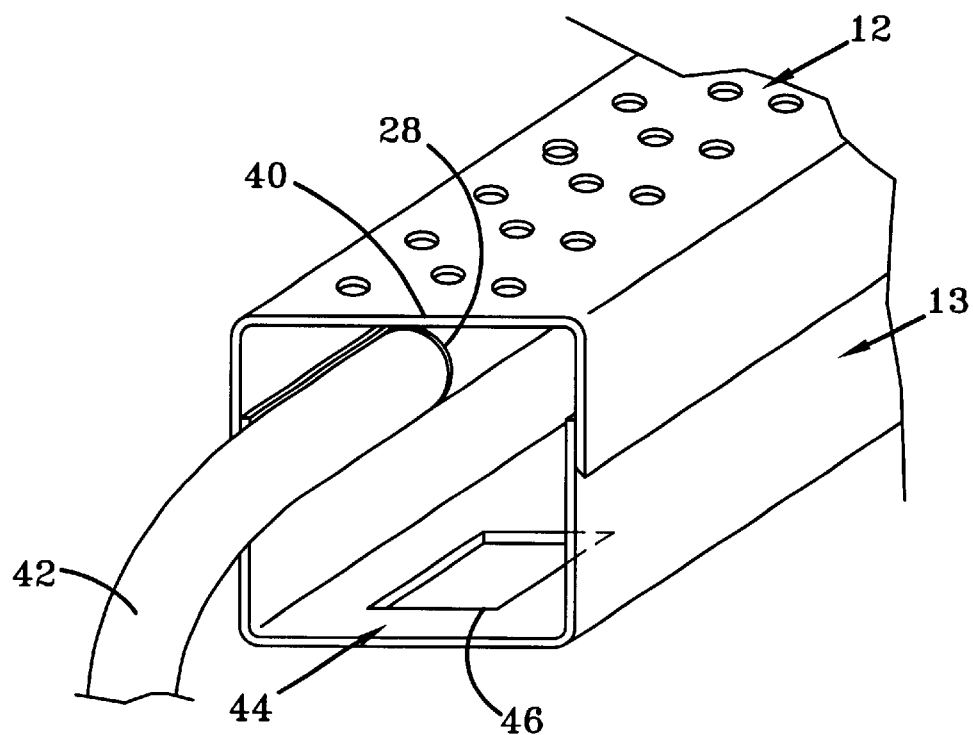
FIG. 4 is a perspective view of the present invention showing the flushing means; and, FIG. 5 is a perspective view of the present invention showing access panels within the drainage pipe.

The cleaning means 28 can take on a variety of shapes and configurations. In its preferred embodiment, however, the tube 30 of the cleaning means 28 is connected to an extension means 40 which allows a fluid source, such as a garden hose, to attach to the cleaning means 28. Alternatively, the extension means 40 can be comprised within the cleaning means 28, such as a male or female thread portion. FIG. 4 shows a garden hose 42 attached to the cleaning means 28. Furthermore, in addition to connecting a water source to the system, the current invention contemplates other sources which can be utilized to remove debris from the pipe 10. For example, an air pressure hose can be connected to the cleaning means 28. Thus, by providing air pressure within the pipe 10 the debris may be moved towards the exit area 34 of the pipe 10.

In operation, the extension means 40 can be connected to one end of the cleaning means 28. For example, the extension means 40 may be housed within a panel of the basement wall. To clean out the pipe 10, the panel would be removed exposing the extension means 40 and a water or air hose is then coupled to the extension means 40. Depending upon how the holes 32 are configured, once the air or water supply is turned "on" the debris within the pipe will be forced along the length of the pipe 10 and forced out an end 34 and drain through a connected downspout. Once the debris has been satisfactorily removed from the pipe 10, the water or air hose can be detached from the extension means 40 and the panel within the basement wall can be closed.

An alternative embodiment of the current invention envisions the flushing source 42 permanently connected to the cleansing means 28. The flushing source may be controllable by a control means such as a valve. Thus, when the valve is open, cleansing means 28 is filled with water or air and this water or air exits through the holes 32 of the cleansing means 28 and forces debris out of the pipe and into catch basin or sewer.

As shown in FIGS. 1–4, the openings 26 are defined within the upper interior portion of the pipe 10. In this configuration, water can pass therethrough and into the pipe for drainage. This geometry is preferable in gutter systems.

If large amounts of debris collect within the pipe 10, which cannot be flushed out of the gutter system, the drainage pipe 10 can be disconnected at an access means 44 from the downspout 52 at a predetermined location to flush out the debris as described in greater detail below.

Figure 5:
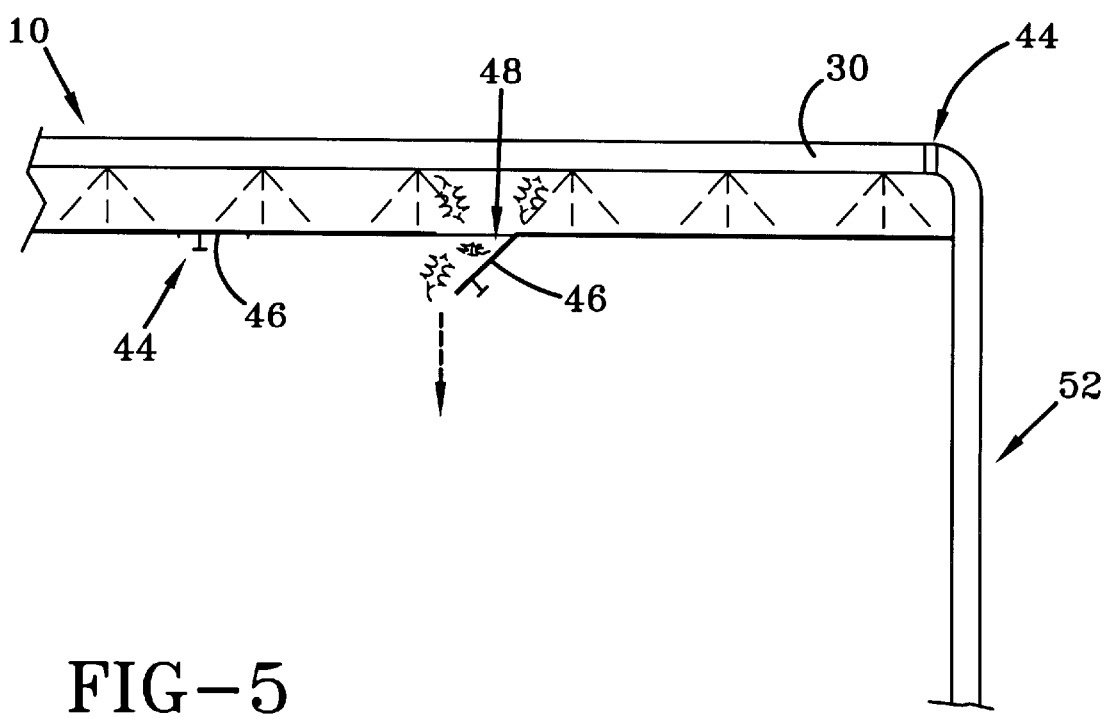

Alternatively, as shown in FIG. 5, the drainage pipe 10 may contain access means 44 at predetermined locations along the length of the pipe 10 to flush out heavily accumulated debris. Access means 44, including without limitation access panels 46, may be operatively connected within the drainage pipe 10 to ensure easy access for cleaning purposes. The access panels 46 may be hingedly or slidably connected to the lower section 13 of the drainage pipe 10, but it is not limited thereto. When using such access panels, the panels can be opened such that a hole 48 is defined therein. The cleaning means is activated such that the associated debris exits the drainage pipe 10 through the hole 48. For example, if wet leaves have accumulated in the drainage pipe 10, the user may force them through the hole 48 defined by the open access panels 46 via the cleaning means 28.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A drainage apparatus for use in a waterproofing system comprising:
    a hollow drainage pipe having a length, an upper interior surface with a plurality of spaced openings therein, and an outlet, said plurality of spaced openings permitting water to enter said hollow drainage pipe from an area surrounding an associated structure; and,
    cleaning means affixed to said upper interior surface, such that said cleaning means provides a pressurized fluid to said hollow drainage pipe to remove associated debris accumulated therein.

2. The drainage apparatus of claim 1 wherein said cross-sectional profile of said drainage pipe is rectangular.

3. The drainage apparatus of claim 1 wherein said drainage pipe comprises:
    an upper section having an inverted U-shaped cross-sectional profile, said upper section including said upper interior surface;
    a lower section having a U-shaped cross-sectional profile; and,
    embracing means for selectively securing said upper section to said lower section.

4. The drainage apparatus of claim 3 wherein said embracing means comprises:
    a plurality of inwardly extending ridges on said upper section.

5. The drainage apparatus of claim 1 wherein said cleaning means comprises:
    a tube having a plurality of spaced holes therein.

6. The drainage apparatus of claim 5 wherein said tube has a length generally equal to said length of said drainage pipe.

7. The drainage apparatus of claim 5 further comprising:
    extension means extending from a first end of said tube.

8. The drainage apparatus of claim 5 wherein at least some of said plurality of spaced holes are angled relative to a plane of said upper interior surface.

9. The drainage apparatus of claim 8 wherein said at least some of said plurality of spaced holes are angled approximately 45° relative to said plane of said upper interior surface.

10. The drainage apparatus of claim 1 wherein said drainage pipe further comprises access means whereby accumulated debris can be easily removed via said cleaning means.

11. A drainage apparatus for use in a waterproofing system comprising:
    a hollow drainage pipe having a length, an upper interior surface having a plurality of spaced openings defined therein, and an outlet, said plurality of spaced openings permitting water to enter said hollow drainage pipe from an area surrounding an associated structure; and
    a tube having a length generally equal to said length of said drainage pipe and having a plurality of spaced holes therein, said tube being affixed to said upper interior surface, such that said tube provides a pressurized fluid to said hollow drainage pipe to remove associated debris accumulated in said plurality of spaced openings and said hollow drainage pipe.

12. The drainage apparatus of claim 11 further comprising:
    extension means extending from a first end of said tube.

13. The drainage apparatus of claim 11 wherein said drainage pipe comprises:
    an upper section having an inverted U-shaped cross-sectional profile;
    a lower section having a U-shaped cross-sectional profile; and,
    embracing means for selectively securing said upper section to said lower section.

14. The drainage apparatus of claim 11, wherein said drainage pipe is a gutter.

15. The drainage apparatus of claim 11, wherein said drainage pipe further comprises access means for removal of accumulated debris at a predetermined location.

16. A method for clearing debris from a hollow drainage pipe having a length, an upper interior surface with a plurality of spaced openings therein, and an outlet, wherein said drainage pipe is used in a waterproofing system, the method including the steps of:
    providing cleaning means affixed to said interior surface, said cleaning means comprising a tube having a length generally equal to said length of said drainage pipe and having a plurality of spaced holes therein, said tube being affixed to said upper interior surface; and
    causing a fluid to flow into said tube and exit through said plurality of spaced holes to force said debris through said outlet in said drainage pipe.

17. The method of claim 16 wherein said cleaning means further comprises an extension means at a first end of said tube, said extension means being adapted for use with an associated fluid source, the method further comprising the step of:
    attaching said extension means to said fluid source.

18. A method of assembling a drainage apparatus for use in a waterproofing system, said drainage apparatus comprising:
    a drainage pipe having an upper section with a plurality of spaced openings defined therein, a lower section, a plurality of spaced openings and embracing means for selectively securing said upper section to said lower section, said plurality of spaced openings permitting water to enter said hollow drainage pipe from an area surrounding an associated structure; and, cleaning means comprising a tube having a plurality of spaced holes therein; said method comprising the steps of:

affixing said tube to an interior surface of said upper section of said drainage pipe;

placing said upper section and said lower section in predetermined relationship to each other;

employing said embracing means to selectively secure said upper section to said lower section; and causing a fluid to flow into said tube and exit through said plurality of spaced holes to remove said debris from said drainage pipe.

19. The method of claim 18 wherein said cleaning means further comprises extension means adapted for use with an associated fluid source, the method further comprising the step of:

affixing said extension means to a first end of said tube.

20. The method of claim 18 wherein said drainage pipe is a gutter.

\* \* \* \* \*